United States Patent
Nagasawa

(10) Patent No.: US 9,575,371 B2
(45) Date of Patent: Feb. 21, 2017

(54) LIQUID CRYSTAL DEVICE AND ELECTRONIC APPARATUS

(71) Applicant: Seiko Epson Corporation, Tokyo (JP)

(72) Inventor: Hitoya Nagasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 198 days.

(21) Appl. No.: 14/504,365

(22) Filed: Oct. 1, 2014

(65) Prior Publication Data

US 2015/0103302 A1    Apr. 16, 2015

(30) Foreign Application Priority Data

Oct. 10, 2013    (JP) .................................. 2013-212633

(51) Int. Cl.
| | |
|---|---|
| *G02F 1/1343* | (2006.01) |
| *G02F 1/1339* | (2006.01) |
| *G02F 1/13* | (2006.01) |
| *G02F 1/1333* | (2006.01) |

(52) U.S. Cl.
CPC ........... *G02F 1/1339* (2013.01); *G02F 1/1309* (2013.01); *G02F 1/134309* (2013.01); *G02F 1/134336* (2013.01); *G02F 2001/13396* (2013.01); *G02F 2001/133388* (2013.01)

(58) Field of Classification Search
None
See application file for complete search history.

(56) References Cited

U.S. PATENT DOCUMENTS

| | | | | |
|---|---|---|---|---|
| 5,982,470 A | * | 11/1999 | Nakahara | .............. G02F 1/1345 349/139 |
| 9,244,321 B2 | * | 1/2016 | Nagasawa | ......... G02F 1/134336 |
| 2010/0253656 A1 | | 10/2010 | Fujikawa | |
| 2013/0128210 A1 | * | 5/2013 | Nagasawa | ........... G02F 1/13452 349/151 |
| 2013/0258263 A1 | * | 10/2013 | Yasukawa | ......... G02F 1/134309 349/138 |

FOREIGN PATENT DOCUMENTS

| | | |
|---|---|---|
| JP | 2002-124554 A | 4/2002 |
| WO | WO-2009-087706 | 7/2009 |

* cited by examiner

*Primary Examiner* — Ryan Crockett
(74) *Attorney, Agent, or Firm* — ALG Intellectual Property, LLC

(57) ABSTRACT

In a liquid crystal device, in an element substrate, a first area, a second area, and a third area are provided in an area overlapped with sealing material which bonds the element substrate and a counter substrate. In addition, a film which is in the same layer as a first pixel electrode is provided in all of the first area, the second area, and the third area. In addition, a plurality of second pixel electrodes which are in the same layer as the first pixel electrode are formed in a area overlapped with the seal material.

13 Claims, 9 Drawing Sheets

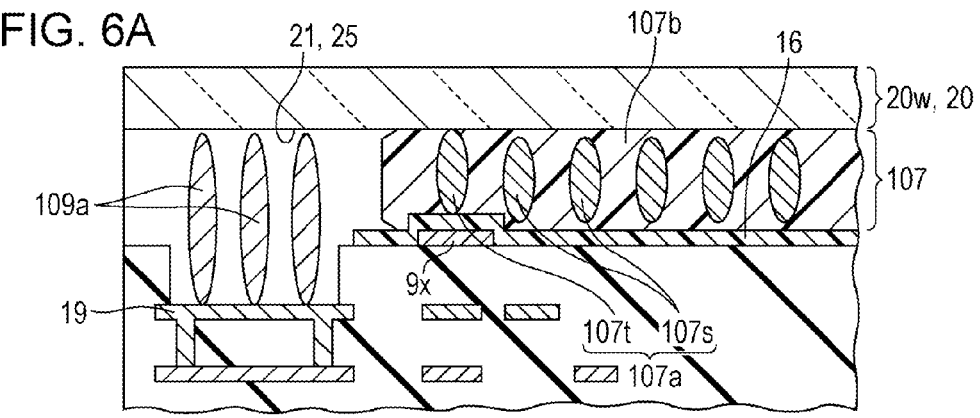
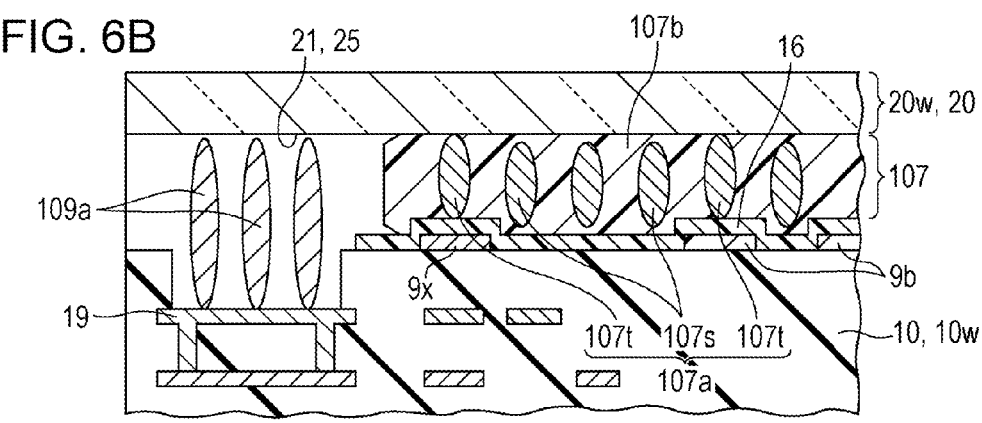
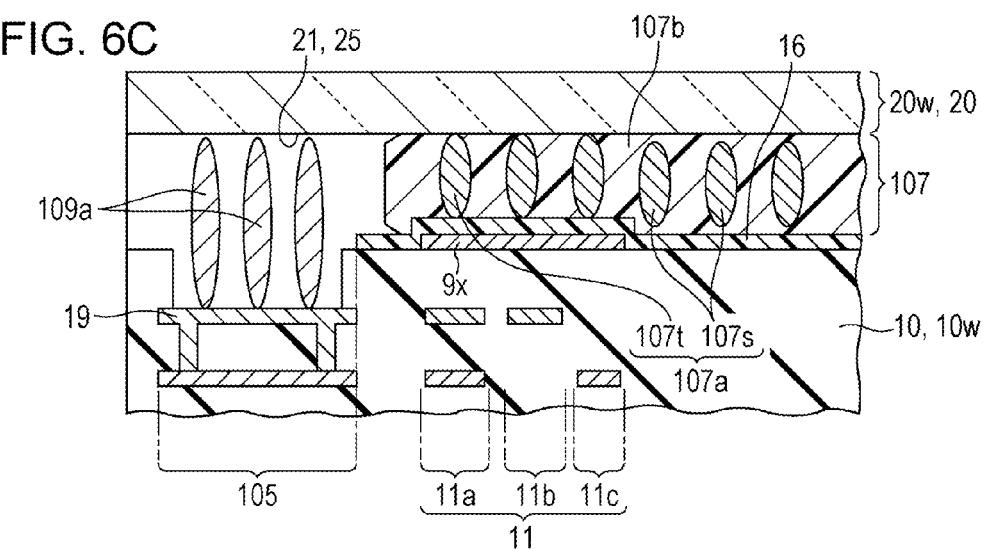

LIQUID CRYSTAL DEVICE AND ELECTRONIC APPARATUS

BACKGROUND

1. Technical Field

The present invention relates to a liquid crystal device in which sealing material is provided between a first substrate and a second substrate, and an electronic apparatus which includes the liquid crystal device.

2. Related Art

In a liquid crystal device, a first substrate for an element substrate in which a plurality of first pixel electrodes are provided in a display area, and a second substrate for a counter substrate that is opposed to a surface on which the first pixel electrodes of the first substrate are provided, are bonded together by sealing material, and a liquid crystal layer is retained within a space which is positioned between the first substrate and the second substrate and is surrounded by the sealing material. In the element substrate, a pixel switching element or a pixel electrode are formed by a plurality of films formed in the first substrate. Due to this, in the first substrate, a film thickness monitor film for monitoring the film thicknesses of the plurality of films is formed.

Meanwhile, in the liquid crystal device, a configuration in which a scribe area of a mother substrate where there are a plurality of element substrates to be cut out, or a test terminal for testing the pixel switching element at an area overlapped with the sealing material is provided, is proposed (refer to JP-A-2002-124554 and International Publication No. 2009/087706). In such a configuration, as in the configuration described in International Publication No. 2009/087706, if the test terminal is provided in the area overlapped with the sealing material, there is an advantage in that the scribe area can be narrowed, compared with a case where the test terminal is provided in the scribe area.

The present inventor has reviewed a case where a film thickness monitor area at which a film thickness monitor film is formed is provided in an area overlapped with sealing material, in the same manner as the configuration described in International Publication No. 2009/087706, but in this case, in the area overlapped with the sealing material, heights of the area in which the film thickness monitor film is formed and another area become different from each other. As a result, in a case where sealing material in which a gap material defining an interval between a first substrate and a second substrate is mixed is used as the sealing material, there is a problem that the interval between the first substrate and the second substrate is varied.

SUMMARY

An advantage of some aspects of the invention is that a liquid crystal device which can suppress variation of an interval between a first substrate and a second substrate, even if a film thickness monitor area is provided in an area overlapped with sealing material, and an electronic apparatus which includes the liquid crystal device, are provided.

According to an aspect of the invention, there is provided a liquid crystal device including: a first substrate having a plurality of first pixel electrodes provided in a display area; a second substrate that is opposed to a surface to which the first pixel electrodes of the first substrate are provided; and sealing material which is provided between the first substrate and the second substrate, in which, between the first substrate and the sealing material, a plurality of second pixel electrodes formed in the same layer as the first pixel electrode is provided, a first film thickness monitor film formed in the same layer as a first film formed between the first substrate and the first pixel electrodes is provided in a first film thickness monitor area which is not overlapped with the second pixel electrodes, a second film thickness monitor film formed in the same layer as a second film formed between the first substrate and the first pixel electrodes is provided in a second film thickness monitor area which is positioned between the second pixel electrodes and the first film thickness monitor area in a planar view, and a film thickness monitor film for a pixel electrode, which is formed in the same layer as the first pixel electrodes and the second pixel electrodes, is provided on both sides of the first film thickness monitor area and the second film thickness monitor area.

In the aspect, in the first substrate, the first film thickness monitor area and the second film thickness monitor area are provided in the area overlapped with the sealing material, and the film thickness monitor film for a pixel electrode which is in the same layer as the first pixel electrode is provided in the first film thickness monitor area and the second film thickness monitor area. Due to this, the film thicknesses of the first film, the second film, and the first pixel electrode can be monitored in the area overlapped with the sealing material, and thereby it is not necessary to provide the first film thickness monitor area and the second film thickness monitor area in the scribe area of a mother substrate. Thus, when the first substrate is fabricated, it is possible to narrow the width of the scribe area of the mother substrate. In addition, while the first film thickness monitor film for a pixel electrode is formed in the first film thickness monitor area and the second first film thickness monitor area, a plurality of the second pixel electrodes which are in the same layer as the first pixel electrodes are formed in the area overlapped with the sealing material. Due to this, in the area overlapped with the sealing material, the difference of distribution among the films which are in the same layer as the first pixel electrode is small. Therefore, even in a case where the film thickness monitor area is provided in the area overlapped with the sealing material, it is possible to reduce the variation of the interval between the first substrate and the second substrate.

In the aspect, in the first substrate, three or more film thickness monitor areas which include the first film thickness monitor area and the second film thickness monitor area may be provided in an area overlapped with the sealing material, and the film thickness monitor film for a pixel electrode may be provided in any one of the plurality of film thickness monitor areas. According to such a configuration, it is possible to further reduce the difference of distribution of the film which is in the same layer as the first pixel electrode in the area overlapped with the sealing material. Therefore, even in a case where the film thickness monitor area is provided in the area overlapped with the sealing material, it is possible to reduce the variation of the interval between the first substrate and the second substrate.

In the aspect, the film thickness monitor film for a pixel electrode may be continuously provided in the first film thickness monitor area and the second film thickness monitor area.

In the aspect, the film thickness monitor film for a pixel electrode may be continuously provided in all of the three or more film thickness monitor areas.

In the aspect, a gap between the second pixel electrode adjacent to the film thickness monitor film for a pixel electrode, among the plurality of second pixel electrodes, and the film thickness monitor film for a pixel electrode may be smaller than a gap between the second pixel electrodes adjacent to each other, among the plurality of second pixel electrodes. According to such a configuration, it is possible to further reduce the difference of distribution of the film which is in the same layer as the first pixel electrode in the area overlapped with the sealing material. Therefore, even in a case where the film thickness monitor area is provided in the area overlapped with the sealing material, it is possible to reduce the variation of the interval between the first substrate and the second substrate.

In the aspect, a substrate-to-substrate conduction unit which electrically connects the first substrate to the second substrate may be provided between the first film thickness monitor area and an end portion of the second substrate, in a planar view. According to such a configuration, the interval between the first substrate and the second substrate, which is in a position where the substrate-to-substrate conduction unit is provided, is stable. Due to this, the first substrate can be electrically connected to the second substrate reliably in the substrate-to-substrate conduction unit.

In the aspect, the sealing material may be formed in a planar shape of a polygon, and the first film thickness monitor area and the second film thickness monitor area may be provided on corners of the polygon.

The liquid crystal device according to the aspect of the invention is used for various electronic apparatuses. Among such electronic apparatuses, a projection type display device includes a light source unit for supplying light to the liquid crystal device, and a projection optical system which projects the light which is modulated by the liquid crystal device.

BRIEF DESCRIPTION OF THE DRAWINGS

The invention will be described with reference to the accompanying drawings, wherein like numbers reference like elements.

FIGS. 6A to 6C are views illustrating a form of a film thickness monitor area of a liquid crystal device according to a reference example of the invention.

DESCRIPTION OF EXEMPLARY EMBODIMENTS

Figure 1A:
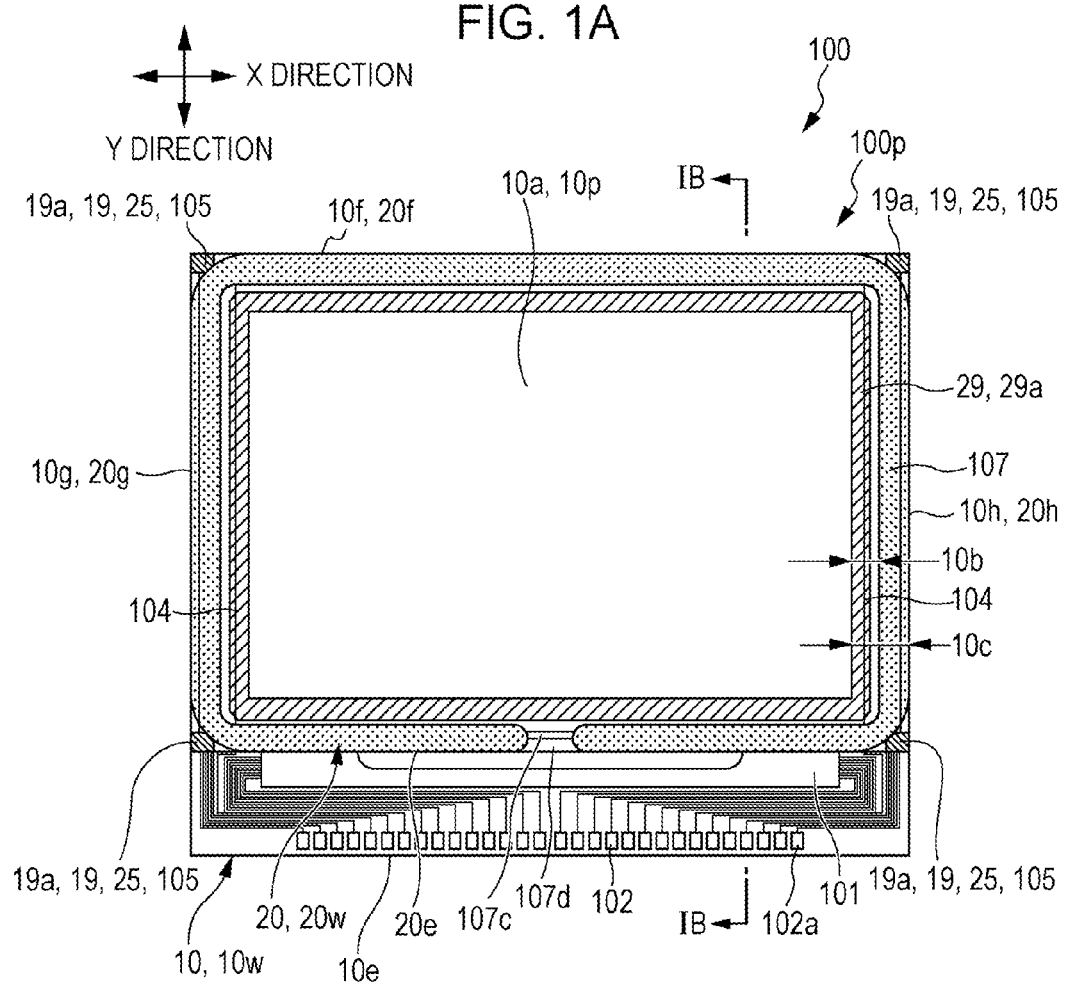
FIGS. 1A and 1B are views illustrating a form of a liquid crystal panel of a liquid crystal device to which the invention is applied.

A liquid crystal device according to embodiments of the invention will be described with reference to the drawings. In addition, in the drawings which are referred to for the following description, since each layer or each member is illustrated in a recognizable size in the drawing, scales different from each other are used for each layer or each member. In addition, in the drawings which are referred to for the following description, the number of pixel electrodes, scan lines, data lines or the like is represented by fewer than the actual number.

Figure 1B:
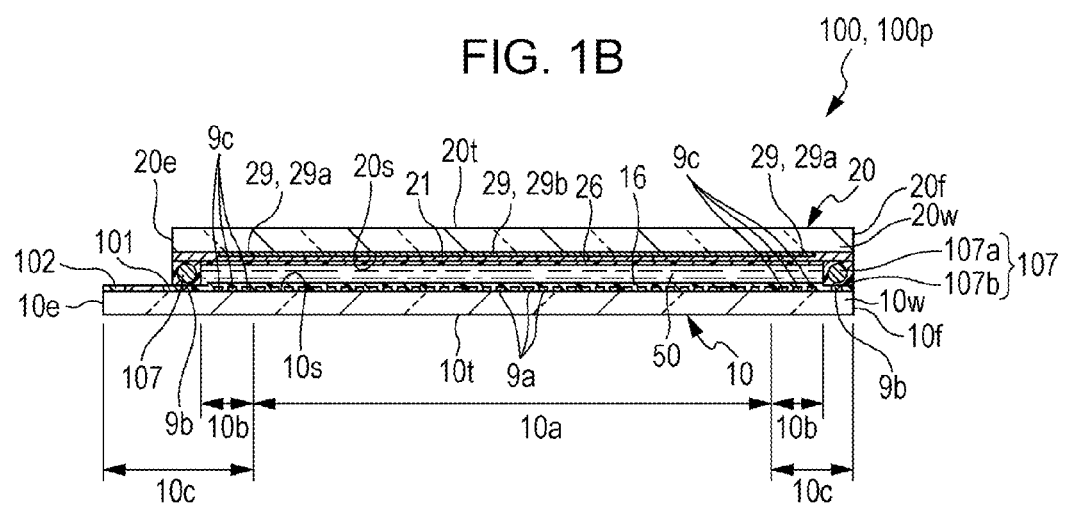
Figure 2A:
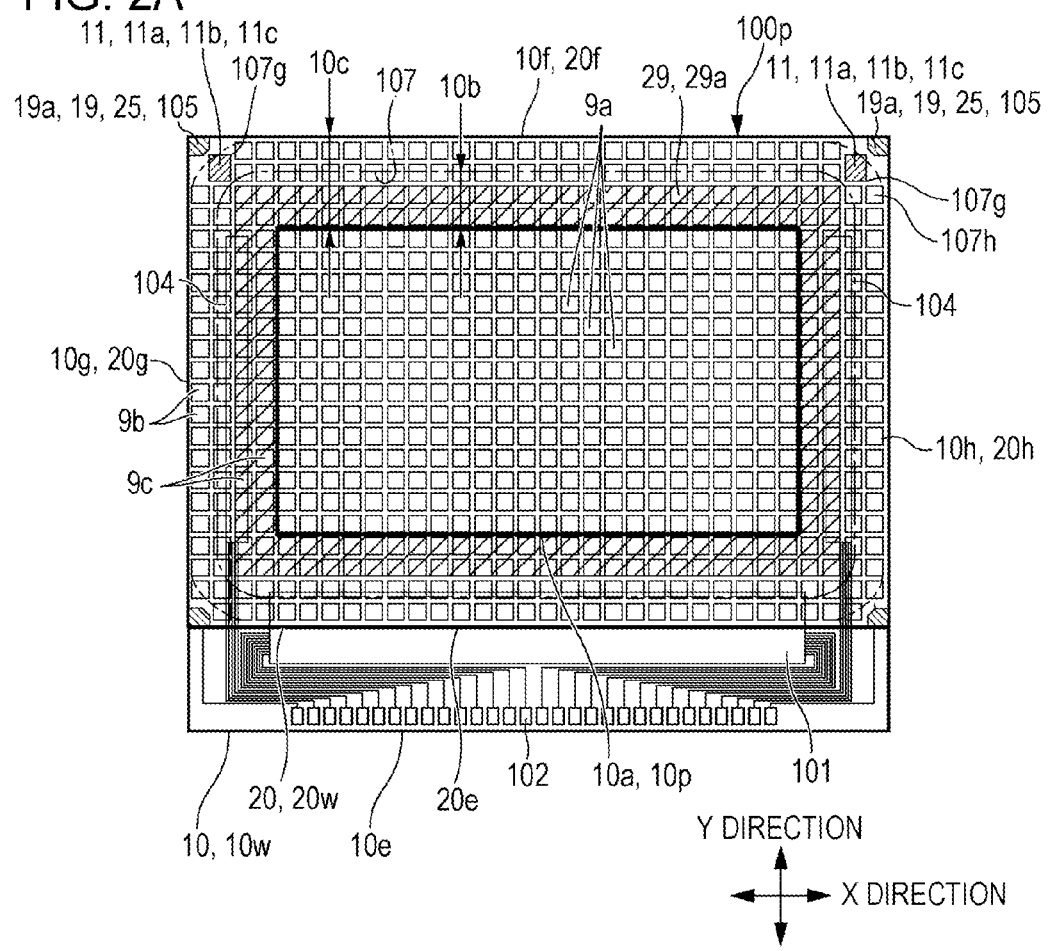
FIGS. 2A and 2B are views illustrating a form of a positional relationship between components of a liquid crystal panel of a liquid crystal device to which the invention is applied.
Figure 2B:
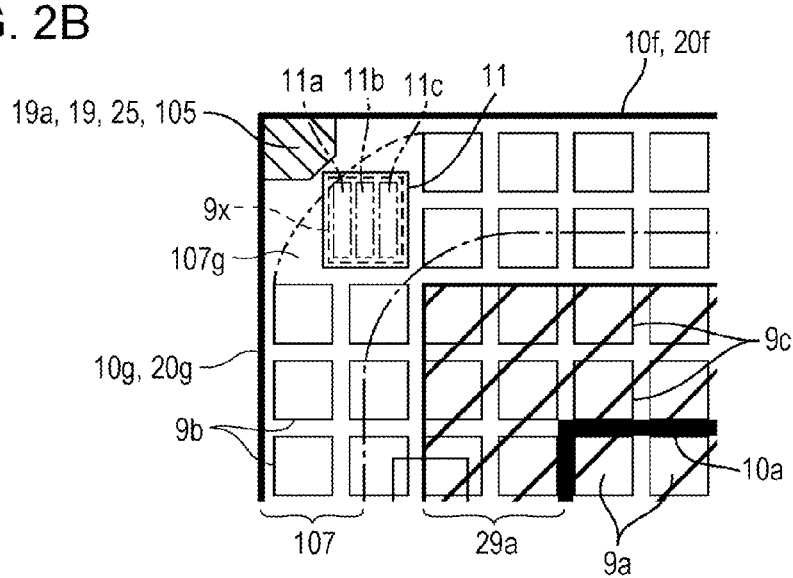

FIGS. 1A and 1B are views illustrating a form of a liquid crystal panel of a liquid crystal device to which the invention is applied. That is, FIG. 1A is a planar view in which a liquid crystal panel is viewed from a counter substrate, and FIG. 1B is an IB-IB' cross-sectional view of the liquid crystal panel. FIGS. 2A and 2B are views illustrating a form of a positional relationship between components of the liquid crystal panel of the liquid crystal device to which the invention is applied. That is, FIG. 2A is a view illustrating a positional relationship between the components of the entire liquid crystal panel, and FIG. 2B is a view illustrating a positional relationship between the components of a corner of the liquid crystal panel.

As illustrated in FIGS. 1A and 1B, and FIGS. 2A and 2B, the liquid crystal device 100 according to this form includes the liquid crystal panel 100$p$. The liquid crystal panel 100$p$ includes an element substrate 10, a counter substrate 20 which is opposed to the element substrate 10, and sealing material 107 provided between the element substrate 10 and the counter substrate 20, and the element substrate 10 and the counter substrate 20 are bonded together by the sealing material 107 via a predetermined gap. In this form, the sealing material 107 is provided in a planar shape of a polygon along an outer edge of the counter substrate 20. In this form, since both the element substrate 10 and the counter substrate 20 have a planar shape of rectangle, the sealing material 107 is provided in a planar shape of rectangle. The sealing material 107 is produced by mixing gap material 107$a$ such as glass fiber or glass beads with an adhesive 107$b$ which is formed from a light-curing resin, a thermosetting resin or the like, and an interval between the element substrate 10 and the counter substrate 20 is defined by the gap material 107$a$. In the liquid crystal panel 100$p$, a liquid crystal layer 50 (electro-optical material layer) which is formed from various kinds of liquid crystal material (electro-optical material) is retained within an area surrounded by the sealing material 107, in a space between the element substrate 10 and the counter substrate 20. In this form, a discontinued portion which is used as a liquid crystal inlet 107$c$ is formed in the sealing material 107, and after liquid crystal material is injected, the liquid crystal inlet 107$c$ is sealed by the sealing material 107$d$.

In the liquid crystal panel 100$p$, both the element substrate 10 and the counter substrate 20 have a rectangular shape, and a first substrate 10$w$ which is a substrate body of the element substrate 10, and a second substrate 20$w$ which is a substrate body of the counter substrate 20 also have a rectangular shape. The element substrate 10 (first substrate 10$w$) includes two sides 10$e$ and 10$f$ (end portions) which are opposed to each other in a Y direction (second direction) and two sides 10$g$ and 10$h$ (end portions) which are opposed to each other in an X direction (first direction). The counter substrate 20 (second substrate 20$w$) includes two sides 20$e$ and 20$f$ (end portions) which are opposed to each other in the Y direction and two sides 20$g$ and 20$h$ (end portions) which are opposed to each other in the X direction. In the approximate center of the liquid crystal panel 100$p$, a display area 10$a$ is provided as a rectangular area, and the sealing material 107 is also provided in an approximate rectangular shape corresponding to such an s shape. An outside of the display area 10$a$ is formed by a peripheral area 10$c$ of a rectangular frame.

In the peripheral area 10c of the element substrate 10, a data line driving circuit 101 and a plurality of terminals 102 are formed along the side 10e which is positioned on one side of the element substrate 10 in a Y axis direction, and a scan line driving circuit 104 is formed along each of sides 10g and 10h adjacent to the side 10e. A flexible wiring substrate (not illustrated) is connected to the terminals 102, and various potentials or various signals are input from an external control circuit to the element substrate 10 via the flexible wiring substrate.

Detailed description will be made with reference to FIGS. 4A and 4B, but in the display area 10a on the surface 10s which is opposed to the counter substrate 20, among one surface 10s and another surface 10t of the element substrate 10, first pixel electrodes 9a or pixel transistors 30 or the like which will be described later with reference to FIGS. 2A and 2B or the like are arranged in a matrix. Thus, the display area 10a is constructed as a pixel electrode arrangement area 10p in which the first pixel electrodes 9a are arranged in a matrix. In the element substrate 10 constructed in such a manner, an alignment film 16 is formed with respect to the first pixel electrodes 9a on a side close to the counter substrate 20.

In an area which is overlapped with the sealing material 107 on the one surface 10s of the element substrate 10, a second pixel electrode 9b formed in the same layer where the first pixel electrodes 9a are formed, and a third pixel electrode 9c is formed in the same layer with the first pixel electrodes 9a and the second pixel electrode 9b is formed at the peripheral area 10b of the rectangular frame interposed between the display area 10a and the sealing material 107 in the peripheral area 10c positioned outside the display area 10a. While the first pixel electrodes 9a directly contribute to the displaying, the second pixel electrode 9b and the third pixel electrode 9c are dummy pixel electrodes which do not directly contribute to the displaying. In addition, the third pixel electrode 9c to which a common potential Vcom is applied, prevents the alignment of liquid crystal molecules in the peripheral end portion of the display area 10a from being disturbed. Due to this, the third pixel electrode 9c is formed in a structure in which the third pixel electrodes 9c adjacent to each other are connected together by connection portions (not illustrated) having a narrow width.

In the one surface 20s and the another surface 20t of the counter substrate 20, the common electrode 21 is formed on the one surface 20s which is opposed to the element substrate 10. The common electrode 21 is formed on approximately the entire surface of the counter substrate 20, or formed across a plurality of pixels 100a as a plurality of strip-shaped electrodes. In this form, the common electrode 21 is formed across approximately the entire surface of the counter substrate 20.

On the one surface 20s of the counter substrate 20, a light shielding layer 29 is formed on a lower layer side of the common electrode 21 (opposite side of element substrate 10), and an alignment film 26 is formed on an upper layer side of the common electrode 21 (element substrate 10). The light shielding layer 29 is formed as a frame portion 29a extending along the outer edge of the display area 10a, and the display area 10a is defined by the inner edge of the light shielding layer 29. In addition, the light shielding layer 29 is formed as a black matrix portion 29b which is overlapped with a pixel area interposed between the first pixel electrodes 9a adjacent to each other. The frame portion 29a is formed in a position overlapped with the third pixel electrode 9c, and the outer edges of the frame portion 29a are in a position which separating a gap between the inner edges of the sealing material 107. Thus, the frame portion 29a and the sealing material 107 are not overlapped with each other.

In the liquid crystal panel 100p, a substrate-to-substrate conduction electrode 25 is formed on four corners of the one surface 20s of the counter substrate 20 in the outside of the sealing material 107, and a substrate-to-substrate conduction electrode 19 is formed in a position which is opposed to the four corners (substrate-to-substrate conduction electrode 25) of the counter substrate 20 on the one surface 10s of the element substrate 10. In this form, the substrate-to-substrate conduction electrode 25 becomes a portion of the common electrode 21. The common potential electrode 19. A substrate-to-substrate conduction member 19a is arranged between the substrate-to-substrate conduction electrode 19 and the substrate-to-substrate conduction electrode 25, and the common electrode 21 of the counter substrate 20 is electrically connected to the element substrate 10 via the substrate-to-substrate conduction electrode 19, the substrate-to-substrate conduction member 19a, and the substrate-to-substrate conduction electrode 25. In this manner, the substrate-to-substrate conduction member 19a is formed, and the common potential Vcom is applied to the common electrode 21 from the element substrate 10. The sealing material 107 is provided along the outer edge of the counter substrate 20 with approximately the same width dimensions, but is curved on the corner side of the counter substrate 20, so as to pass through the inside to avoid a substrate-to-substrate conduction unit 105.

In this form, the liquid crystal device 100 is a transmissive liquid crystal device, and the first pixel electrodes 9a and the common electrode 21 are formed by a transparent conductive film such as an indium tin oxide (ITO) film, and an indium zinc oxide (IZO) film. In the transmissive liquid crystal device 100, for example, while light incident from the counter substrate 20 is emitted to the element substrate 10, the light is modulated and thereby an image is displayed. In addition, in a case where the liquid crystal device 100 is a reflection type liquid crystal device, the common electrode 21 is formed by a transparent conductive film such as the ITO film or the IZO film, and the first pixel electrodes 9a are formed by a reflective conductive film such as an aluminum film. In the reflection type liquid crystal device 100, between the element substrate 10 and the counter substrate 20, while light incident from the counter substrate 20 is reflected by the element substrate 10 and then emitted, the light is modulated, and thereby the image is displayed.

The liquid crystal device 100 can be used as a color display device of an electronic apparatus such as a mobile computer or a cellular phone, and in this case, a color filter (not illustrated) is formed in the counter substrate 20. In addition, the liquid crystal device 100 can be used as electronic paper. In addition, in the liquid crystal device 100, a polarization film, a phase difference film, a polarization plate or the like is disposed in a predetermined direction with respect to the liquid crystal panel 100p according to the type of the liquid crystal layer 50 to be used, or a selection of a normal white mode or a normal black mode. Furthermore, the liquid crystal device 100 can be used as a light valve for RGB, in the projection type display device (liquid crystal projector/electronic apparatus) described later. In this case, in each of the liquid crystal device 100 for RGB, since light of each color separated via a dichroic mirror for RGB color separation is incident as projection light, the color filter is not formed.

Electrical Configuration of Element Substrate 10

Figure 3A:
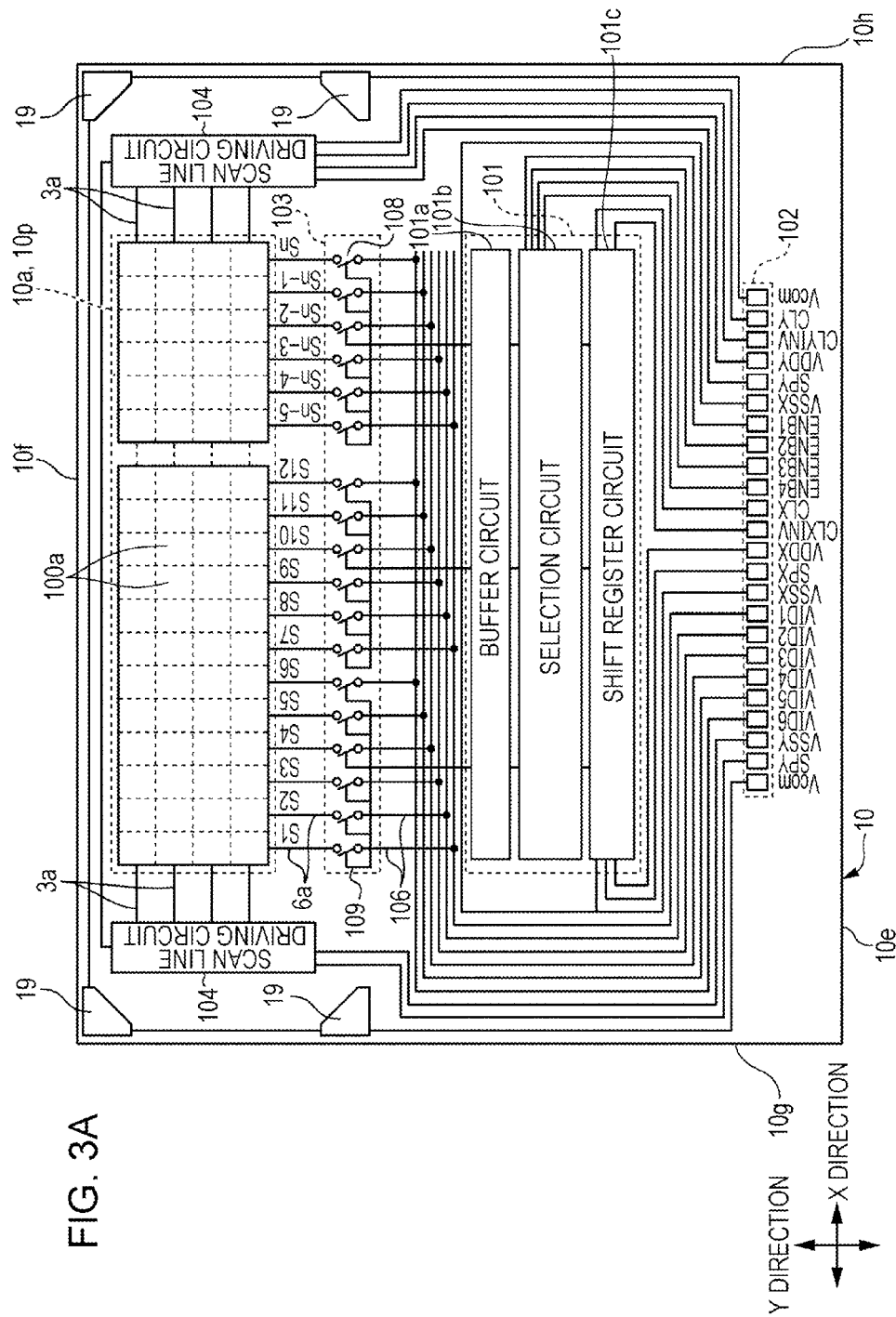
FIGS. 3A and 3B are views illustrating a form of an electrical configuration of an element substrate of a liquid crystal device to which the invention is applied.
Figure 3B:
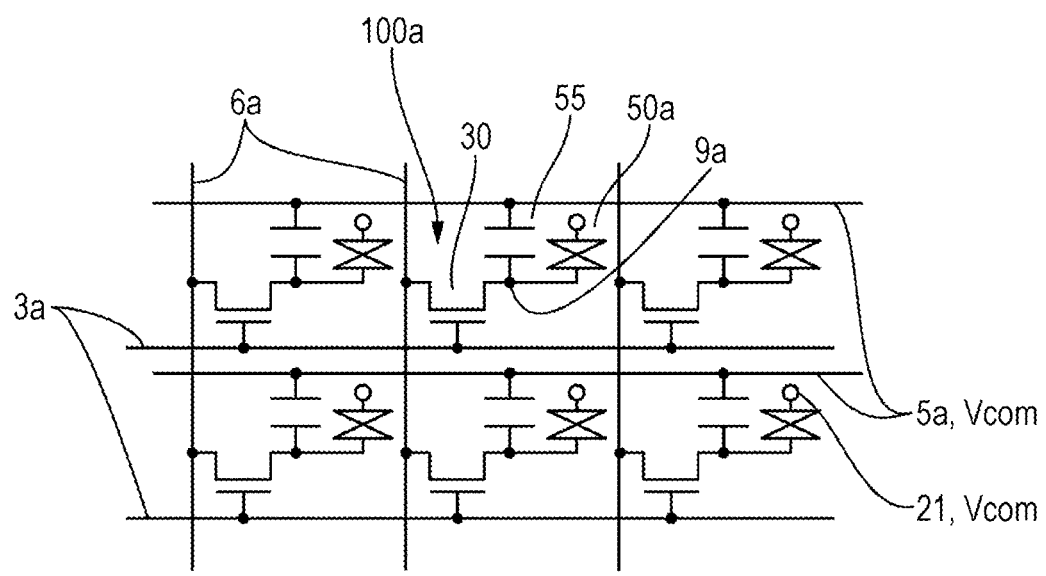

FIGS. 3A and 3B are views illustrating a form of an electrical configuration of the element substrate 10 of the liquid crystal device 100 to which the invention is applied. That is, FIG. 3A is a view illustrating a planar layout of a circuit or wires of the element substrate 10, and FIG. 3B is a view illustrating electrical configurations of the pixels. In addition, in the following description, for names of signals which are input to the element substrate 10 via the terminals 102 and for wires for the signals, the same alphabet symbols are written on the back of the signals and the wire L. For example, with respect to "clock signal CLX" which is a signal name, a corresponding wire for the signal is referred to as "clock signal line LCLX. In addition, in the following description, for names of signals which are input to the element substrate 10 via the terminals 102 and for wires for the signals, the same alphabet symbols are written on the back of the signals and the terminal T. For example, with respect to the "clock signal CLX" which is a signal name, a corresponding terminal 102 is referred to as "terminal TCLX.

As illustrated in FIGS. 3A and 3B, in the liquid crystal device 100, the pixel electrode arrangement area 10p in which a plurality of pixels 100a are arranged in a matrix is provided in a central area of the element substrate 10, and in the pixel electrode arrangement area 10p, an area which is surrounded by an inner edge of the frame portion 29a illustrated in FIG. 1B is the display area 10a. Inside of the pixel electrode arrangement area 10p of the element substrate 10, a plurality of scan lines 3a extending in the X direction, and a plurality of data lines 6a extending in the Y direction are formed, and the pixel 100a is configured in a position corresponding to an intersection therewith. In each of the plurality of pixels 100a, the pixel transistor 30 (pixel switching element) which is configured with a TFT and the first pixel electrodes 9a are formed. The data line 6a is electrically connected to the source of the pixel transistor 30, the scan line 3a is electrically connected to the gate of the pixel transistor 30, and the first pixel electrodes 9a are electrically connected to the drain of the pixel transistor 30.

In the peripheral area 10c of the outside of the pixel electrode arrangement area 10p in the element substrate 10, a scan line driving circuit 104, a data line driving circuit 101, a sampling circuit 103, the substrate-to-substrate conduction electrode 19, the terminals 102, and the like are formed, and a plurality of wires extend toward the scan line driving circuit 104, the data line driving circuit 101, the sampling circuit 103, and the substrate-to-substrate conduction electrode 19 from the terminals 102. The sampling circuit 103 is electrically connected to the plurality of data lines 6a, and the scan line driving circuit 104 is electrically connected to the plurality of scan lines 3a.

In each pixel 100a, the first pixel electrodes 9a are opposed to the common electrode 21 formed in the counter substrate 20 which is described with reference to FIGS. 1A and 1B, via the liquid crystal layer 50, and configures a liquid crystal capacitor 50a. In addition, in order to prevent the image signal retained in the liquid crystal capacitor 50a from varying, a retention capacitor 55 is added in parallel with the liquid crystal capacitor 50a, in each pixel 100a. In this form, in order to configure the retention capacitor 55, capacitor lines 5a are formed so as to be extended across the plurality of pixels 100a, and a potential Vcom is applied to such a capacitor line 5a. In addition, as the potential Vcom, the same potential as the common potential which is applied to the common electrode 21 can be used.

The terminals 102 provided along the side 10e of the element substrate 10 are configured by a plurality of terminal groups which are broadly classified into four uses of a common potential line, a scan line driving circuit, an image signal, and a data line driving circuit. Specifically, the terminals 102 include a terminal TVcom for the common potential line LVcom, a terminal TSPY for the scan line driving circuit 104, a terminal TVSSY, a terminal TVDDY, a terminal TCLY, and a terminal TCLYINV. In addition, the terminals 102 include terminals TVID1 to TVID6 for image signals VID1 to VID6, and a terminal TVSSX, a terminal TSPX, a terminal TVDDX, a terminal TCLX, a terminal TCLXINV, terminals TENB1 to TENB4, and a terminal TVSSX, for the data line driving circuit 101.

The data line driving circuit 101 includes a shift register circuit 101c, a selection circuit 101b, and a buffer circuit 101a. In the data line driving circuit 101, the shift register circuit 101c uses a negative power supply VSSX and a positive power supply VDDX which are supplied from an external control circuit via the terminals 102 (terminals TVSSX and TVDDX) and the wires 105 (wires LVSSX and LVDDX) as a power supply, and starts a transfer operation based on a start signal SPX which is supplied from the external control circuit via the terminal 102 (terminal TSPX) and the wire 105 (wire SPX). The shift register circuit 101c sequentially outputs transfer signals to the selection circuit 101b at a predetermined timing, based on a clock signal CLX and an anti-phase clock signal CLXINV which are supplied via the terminals 102 (terminals TCLX and TCLX-INV) and the wires 105 (wires LCLX and LCLXINV). The selection circuit 101b is referred to as an "enable circuit", and limits the pulse widths of the transfer signals which are sequentially output from the shift register circuit 101c to the pulse widths of the enable signals ENB1 to ENB4 which are supplied from the external control circuit via the terminals 102 (terminals TENB1 to TENB4) and the wires 105 (wires LENB1 to LENB4), thereby defining a sampling period of the sampling circuit 103 described later. More specifically, the selection circuit 101b is configured by a NAND circuit, an inverter, and the like which are provided so as to correspond to each stage of the shift register circuit 101c, and the transfer signals which are sequentially output by the shift register circuit 101c become high level, and only when one of the enable signals ENB1 to ENB4 becomes high level, is a selection control of a waveform performed in a time base in such a manner that the data lines 6a are driven. After the transfer signal in which the selection of a waveform is performed in such a manner is buffered, the buffer circuit 101a supplies the buffered signal to the sampling circuit 103 via a sampling circuit driving signal line 109 as a sampling circuit driving signal.

The sampling circuit 103 includes a plurality of switching elements 108, each sampling the image signal. In this form, the switching element 108 is configured by a field effect transistor such as a TFT. The data lines 6a are electrically connected to the drains of the switching elements 108, the wires 105 (image signal lines LVID1 to LVID6) are connected to the sources of the switching elements 108 via the wires 106, and the sampling circuit driving signal lines 109 which are connected to the data line driving circuit 101 are connected to the gates of the switching elements 108. Then, according to the sampling circuit driving signal supplied via the sampling circuit driving signal line 109 from the data line driving circuit 101, the image signals VID1 to VIDE which are supplied to the wires 105 (image signal lines LVID1 to LVID6) via the terminals 102 (terminals TVID1 to TVID6) are sampled by the sampling circuit 103, and are supplied to each data line 6a as the image signals S1, S2, S3, . . . Sn. In this form, the image signals S1, S2, S3, . . . Sn, corresponding to each of the image signals VID1 to VIDE which are deployed in serial-parallel in six phases, are supplied to each group with respect to a set of six data lines 6a. In addition, the number of phase deployments of the image signals is not limited to six phases, and the image signals which are deployed in a plurality of phases, for example, nine phases, twelve phases, twenty four phases, forty eight phases, or the like are supplied to a set of data lines 6a in which the number corresponding to the number of deployments is defined as one set.

The scan line driving circuit 104 includes a shift register circuit and a buffer circuit as a component. The scan line driving circuit 104 uses a negative power supply VSSY and a positive power supply VDDY which are supplied from the external control circuit via the terminals 102 (terminals TVSSY and TVDDY) and the wires 105 (terminals LVSSY and LVDDY), as a power supply, and according to a start signal SPY which is supplied from the external control circuit via the terminal 102 (terminal TSPY) and the wire 105 (wire LSPY), starts a transfer operation of the embedded shift register circuit. In addition, the scan line driving circuit 104, based on a clock signal CLY and an anti-phase clock signal CLYINV which are supplied via the terminals 102 (terminals TCLY and TCLYINV) and the wires 105 (wires LCLY and LCLYINV), sequentially applies the scan signals to the scan lines 3a in a pulse form at a predetermined timing.

A common potential line LVcom is formed in the element substrate 10 so as to pass through four substrate-to-substrate conduction electrodes 19, and the common potential Vcom is supplied to the substrate-to-substrate conduction electrode 19 via the terminal 102 (terminal TVcom) and the common potential line LVcom.

Specific Configuration of Pixel 100a

Figure 4A:
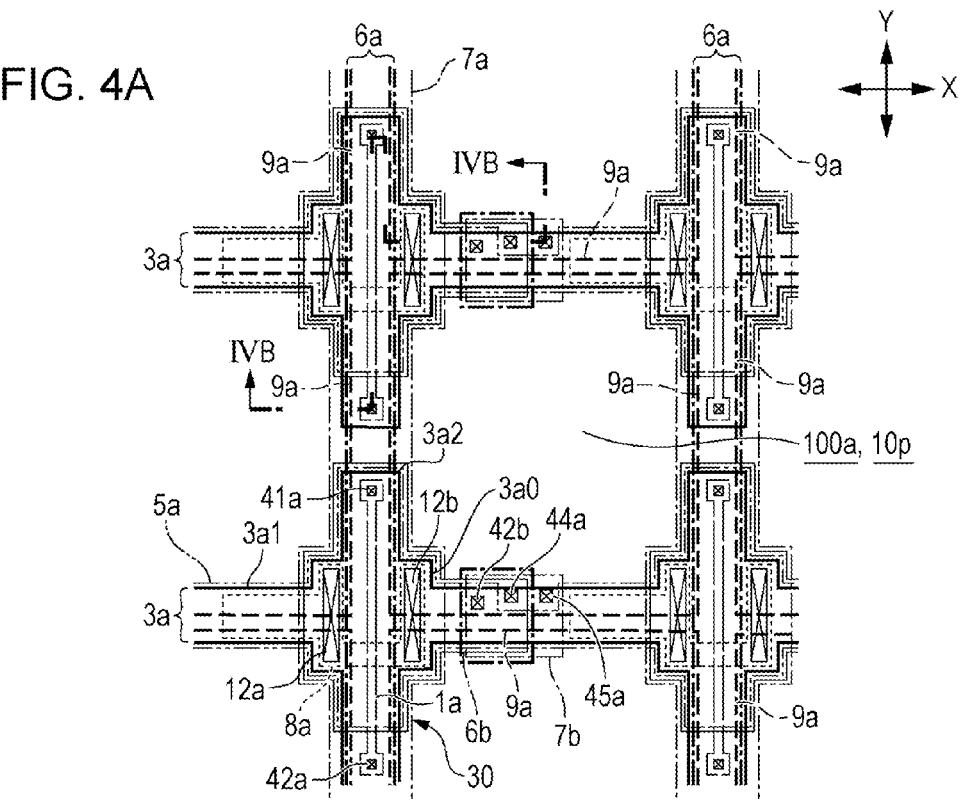
FIGS. 4A and 4B are views illustrating a form of a pixel of a liquid crystal device to which the invention is applied.
Figure 4B:
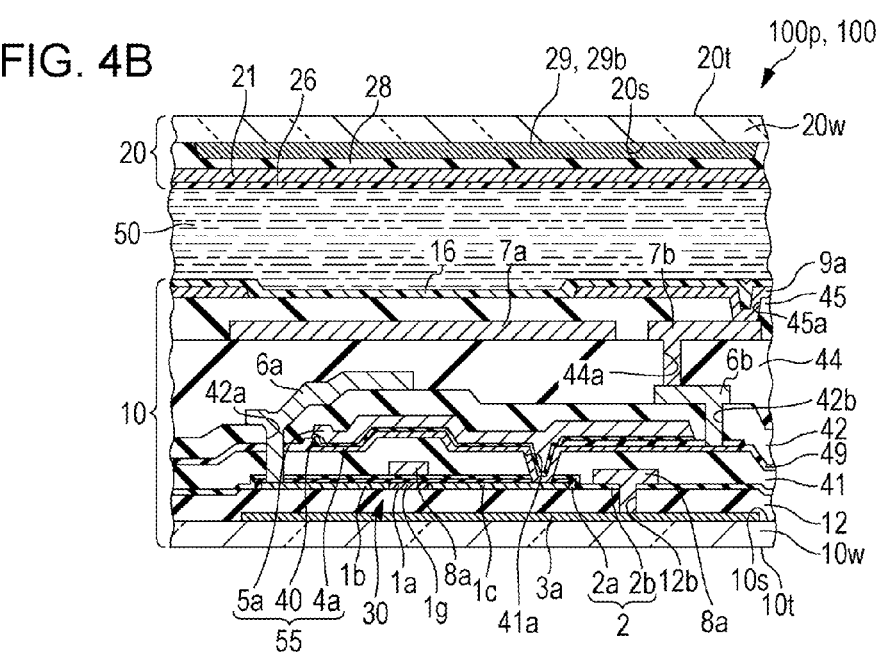

FIGS. 4a and 4B are views illustrating a form of the pixel 100a of the liquid crystal device 100 in which the invention is applied. That is, FIG. 4A is a planar view of a plurality of pixels adjacent to each other in the element substrate 10, and FIG. 4B is an IV-IV' cross-sectional view of the liquid crystal device 100. In addition, FIG. 4A illustrates each layer as follows: the scan line 3a is illustrated by a thick solid line, a semiconductor layer 1a is illustrated by a thin and long dashed line, a gate electrode 8a is illustrated by a dotted line, a drain electrode 4a is illustrated by a thin solid line, the capacitor line 5a is illustrated by a thin two-dot chain line, a data line 6a and a relay electrode 6b are illustrated by thick one-dot chain lines, a light-shielding layer 7a and a relay electrode 7b are thin one-dot chain lines, and the first pixel electrode 9a is illustrated by a thick dashed line. In addition, in FIG. 4A, in the layer in which end portions are overlapped with each other in a planar view, the position of the end portion is shifted in such a manner that the shape or the like of the layer is easily separated.

As illustrated in FIG. 4A, in the one surface 10s which is opposed to the counter substrate 20 (second substrate 20w) in the element substrate 10 (first substrate 10w), the first pixel electrodes 9a are formed in each of the plurality of the pixels 100a, and the data line 6a and the scan line 3a are formed along a pixel-to-pixel area interposed between the first pixel electrodes 9a adjacent to each other. In this form, the pixel-to-pixel area is extended vertically and horizontally, and the scan lines 3a are linearly extended along a first pixel-to-pixel area extending in the X direction at the pixel-to-pixel area, and the data lines 6a are linearly extended along a second pixel-to-pixel area extending in the Y direction in the pixel-to-pixel area. In addition, the pixel transistor 30 is formed in correspondence to an intersection of the data lines 6a and the scan lines 3a. In this form, the pixel transistor 30 is formed by an intersection area of the data lines 6a and the scan lines 3a and formed by using a periphery thereof, the capacitor line 5a is formed in the element substrate 10, and the common potential Vcom is applied to the capacitor line 5a. In this form, the capacitor line 5a is extended so as to be overlapped with the scan lines 3a.

The light-shielding layer 7a is formed with respect to the pixel transistor 30 on a side close to the counter substrate 20 and the light-shielding layer 7a is extended so as to be overlapped with the data lines 6a. The scan line 3a is formed on an lower layer side of the pixel transistor 30, and such scan lines 3a include a main line portion 3a1 which is linearly extended in the X direction, and a sub-line portion 3a2 which is extended so as to be overlapped with the data line 6a at the intersection of the data line 6a and the sub-line portion 3a2. In addition, the scan line 3a includes a rectangular portion 3a0 at the intersection of the data line 6a and the scan line 3a.

As illustrated in FIG. 4B, the element substrate 10 includes the first pixel electrodes 9a, the pixel transistor 30, and the alignment film 16 which are formed over a substrate surface (one surface 10s opposing to counter substrate 20) of the first substrate 10w having transparency, such as a quartz substrate or a glass substrate on a side close to the liquid crystal layer 50. The counter substrate 20 includes the second substrate 20w having transparency, such as a quartz substrate or a glass substrate, the light shielding layer 29, the common electrode 21, and the alignment film 26 formed over a surface (one surface 20s opposing to element substrate 10) of the second substrate 20w on a side close to the liquid crystal layer 50.

In the element substrate 10, a polysilicon film with conductivity, a metal silicide film, and the scan line 3a formed from a conductive film such as a metal film or a metal compound film are formed on the one surface 10s of the first substrate 10w. In this form, the scan line 3a is formed by a light shielding film such as tungsten silicide (WSi), and prevents the pixel transistor 30 from malfunction due to a photocurrent occurring when the light which passes through the liquid crystal device 100 is reflected by another member and the reflected light is incident to the semiconductor layer 1a.

In the one surface 10s of the first substrate 10w, an insulation film 12 having transparency such as silicon oxide film is formed over an upper layer side (counter substrate 20) of the scan lines 3a, and the pixel transistor 30 which includes the semiconductor layer 1a is formed on the insulation film 12. The pixel transistor 30 includes the semiconductor layer 1a in a long side direction in an extending direction of the data line 6a, and the gate electrode 8a which is overlapped with a central portion in a length direction of the semiconductor layer 1a. A gate insulation layer 2 having translucency is formed between the semiconductor layer 1a and the gate electrode 8a. The semiconductor layer 1a includes a channel area 1g which opposes the gate electrode 8a via the gate insulation layer 2, and a source area 1b and a drain area 1c are formed on both sides of the channel area 1g. In this form, the pixel transistor 30 includes an LDD structure. Thus, the source area 1b and the drain area 1c include low-concentration areas on both sides of the channel area 1g, respectively, and include high-concentration areas in area adjacent to an opposite side of the channel area 1g with respect to the low-concentration areas.

The semiconductor layer 1a is formed by the polysilicon film or the like. The gate insulation layer 2 is formed by a two-layer structure with a first gate insulation layer 2a that is formed from a polysilicon oxide film in which the semiconductor layer 1a is thermally oxidized, and with a second gate insulation layer 2b which is formed from a silicon oxide film formed using a low pressure CVD at high temperature conditions of 700 to 900° C.

The gate electrode 8a is formed from a polysilicon film with conductivity, a metal silicide film, or a conductive film such as a metal film or a metal compound film. In this form, the gate electrode 8a has a two-layer structure with a polysilicon film having conductivity, and a tungsten silicide film. The gate electrode 8a is electrically connected to the scan line 3a via contact holes 12a and 12b which pass through a gate insulation layer 2 and the insulation film 12 at a position interposed between both sides of the semiconductor layer 1a in the X direction.

On an upper layer side (counter substrate 20) of the gate electrode 8a, an interlayer insulation film 41 having translucency, which is formed from a silicon oxide film such as NSG, PSG, BSG, BPSG or the like, is formed, and on an upper layer of the interlayer insulation film 41, a drain electrode 4a is formed. In this form, the interlayer insulation film 41 is formed from a silicon oxide film. The drain electrode 4a is formed from a polysilicon film with conductivity, a metal silicide film, or a conductive film such as a metal film or a metal compound film. In this form, the drain electrode 4a is formed from a titanium nitride film. The drain electrode 4a is formed in such a manner that a portion thereof is overlapped with the drain area 1c (source-drain area on pixel electrode side) of the semiconductor layer 1a, and is electrically connected to the drain area 1c via a contact hole 41a which passes through the interlayer insulation film 41 and the gate insulation layer 2.

On an upper layer side (counter substrate 20) of the drain electrode 4a, an insulation film 49 having translucency which is formed from a silicon oxide film, and a dielectric layer 40 having translucency are formed, and on an upper layer side of the dielectric layer 40, the capacitor line 5a is formed. As the dielectric layer 40, a silicon compound such as a silicon oxide film or a silicon nitride film can be used, and in addition to this, a dielectric layer with a high dielectric constant, such as a aluminum oxide film, a titanium oxide film, a tantalum oxide film, a niobium oxide film, a hafnium oxide film, a lanthanum oxide film, or a zirconium oxide film can be used. The capacitor line 5a is formed from a polysilicon film having conductivity, a metal silicide film, or a conductive film such as a metal film or a metal compound film. In this form, the capacitor line 5a has a three-layer structure with a tantalum nitride film, an aluminum film, and a titanium nitride film. Here, the capacitor line 5a is overlapped with the drain electrode 4a via the dielectric layer 40, and configures the retention capacitor 55.

On an upper layer side (counter substrate 20) of the capacitor line 5a, an interlayer insulation film 42 is formed, and on an upper layer side (counter substrate 20) of such an interlayer insulation film 42, the data line 6a and a relay electrode 6b are formed in the same layer. The interlayer insulation film 42 is formed from a silicon oxide film. The data line 6a and the relay electrode 6b are formed from a polysilicon film having conductivity, a metal silicide film, or a conductive film such as a metal film or a metal compound film. In this form, the data line 6a and the relay electrode 6b are formed by a two-layer laminated film to a four-layer laminated film which includes an aluminum alloy film, or a titanium nitride film and an aluminum film. The data line 6a is electrically connected to the source area 1b (source-drain area on data line side) via a contact hole 42a which passes through the interlayer insulation film 42, an insulation film 49, the interlayer insulation film 41, and the gate insulation layer 2. The relay electrode 6b is electrically connected to the drain electrode 4a via a contact hole 42b which passes through an interlayer insulation film 42 and the insulation film 49.

On an upper layer side (counter substrate 20) of the data line 6a and the relay electrode 6b, an interlayer insulation film 44 having translucency which is formed from a silicon oxide film or the like is formed, and the surface (surface on counter substrate 20) of the interlayer insulation film 44 is planarized. On an upper layer side (counter substrate 20) of such an interlayer insulation film 44, a light-shielding layer 7a and a relay electrode 7b are formed in the same layer. The interlayer insulation film 44 is formed from a silicon oxide film which is formed by using, for example, a plasma CVD method in which tetraethoxysilane and oxygen gas are used, another plasma CVD method in which silane gas and nitrous oxide gas, or the like, and a surface thereof is planarized. The light-shielding layer 7a and the relay electrode 7b are formed from a polysilicon film having conductivity, a metal silicide film, or a conductive film such as a metal film or a metal compound film. In this form, the light-shielding layer 7a and the relay electrode 7b are formed by a two-layer laminated film to a four-layer laminated film which includes an aluminum alloy film, or a titanium nitride film and an aluminum film. The relay electrode 7b is electrically connected to the relay electrode 6b via a contact hole 44a which passes through the interlayer insulation film 44. The light-shielding layer 7a is extended so as to be overlapped with the data line 6a, and functions as a light-shielding layer. In addition, by electrically connecting together the light-shielding layer 7a and the capacitor line 5a, they may be used as a shield layer.

On an upper layer side (counter substrate 20) of the light-shielding layer 7a and the relay electrode 7b, an interlayer insulation film 45 having translucency which is formed from a silicon oxide film or the like, is formed, and on an upper layer side (counter substrate 20) of such an interlayer insulation film 45, the first pixel electrode 9a which is formed from an ITO film is formed. Thus, the second pixel electrode 9b and the third pixel electrode 9c which are described with reference to FIGS. 1A and 1B, and FIGS. 2A and 2B are also formed on the surface (side surface of counter substrate 20) of the interlayer insulation film 45 in the same manner as the first pixel electrodes 9a.

In the interlayer insulation film 45, the contact hole 45a which reaches the relay electrode 7b by passing through the interlayer insulation film 45 is formed, and the first pixel electrode 9a is electrically connected to the relay electrode 7b via the contact hole 45a. As a result, the first pixel electrode 9a is electrically connected to the drain area 1c via the relay electrode 7b, the relay electrode 6b, and the drain electrode 4a. The interlayer insulation film 45 is formed from a silicon oxide film which is formed by using, for example, the plasma CVD method in which tetraethoxysilane and oxygen gas are used, the plasma CVD method in which using silane gas and nitrous oxide gas, or the like. In addition, there is a case where the interlayer insulation film 45 has a first insulation film on a lower layer side which is formed from non-silicate glass (NSG), and a second insulation film on an upper layer side which is formed from boron silicate glass (BSG). In this case, the surface (side surface of counter substrate 20) of the interlayer insulation film 45 is planarized.

On the surface side of the first pixel electrode 9a, the alignment film 16 which is formed from polyimide or an inorganic alignment film is formed. In this form, the alignment film 16 is formed from an oblique deposition film (tilted vertical alignment film/inorganic alignment film) such as SiOx (x<2), SiO$_2$, TiO$_2$, MgO, Al$_2$O$_3$, In$_2$O$_3$, Sb$_2$O$_3$, Ta$_2$O$_5$.

Configuration of Counter Substrate 20

In the counter substrate 20, the light shielding layer 29, an insulation film 28 formed from a silicon oxide film or the like, and the common electrode 21 which is formed from a conductive film having transparency such as an ITO film or the like, are formed on the surface (one surface 20s which is opposed to the element substrate 10) of the second substrate 20w (transparent substrate) having transparency such as a quartz substrate, a glass substrate or the like on a side close to the liquid crystal layer 50. The alignment film 26 formed from polyimide or an inorganic alignment film is formed so as to cover the common electrode 21. In this form, the common electrode 21 is formed from an ITO film. In this form, the alignment film 26 is formed from an oblique deposition film (tilted vertical alignment film/inorganic alignment film) such as SiOx (x<2), SiO$_2$, TiO$_2$, MgO, Al$_2$O$_3$, In$_2$O$_3$, Sb$_2$O$_3$, Ta$_2$O$_5$, in the same manner as the alignment film 16. Such alignment films 16 and 26 perform a vertically tilted alignment with respect to a nematic liquid crystal compound with negative dielectric anisotropy which is used for the liquid crystal layer 50, and the liquid crystal panel 100p operates in a normally black VA mode. In this form, an oblique deposition film of a silicon oxide film (SiOx) among various inorganic alignment films is used as the alignment film 16 and 26.

Configuration of Film Thickness Monitor Area

Figure 5A:
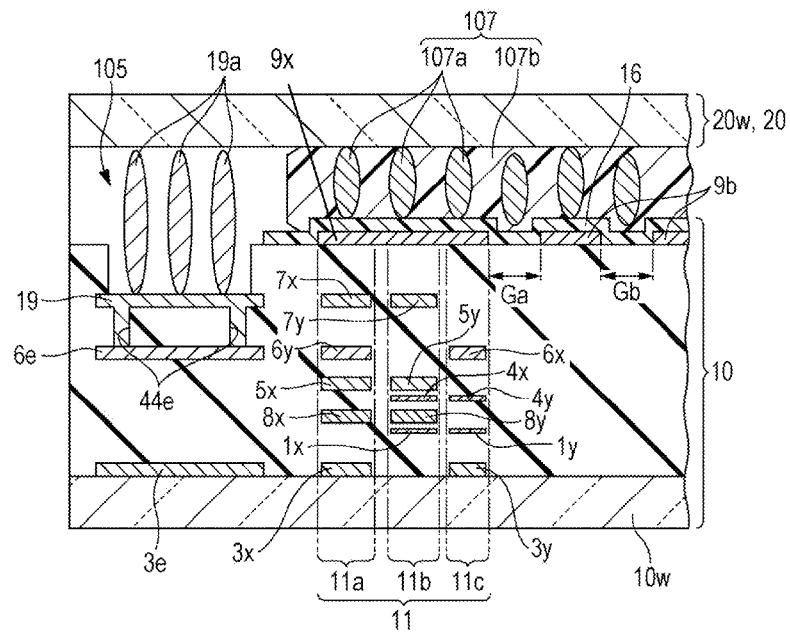
FIGS. 5A and 5B are views illustrating a form of a film thickness monitor area of a liquid crystal device to which the invention is applied.
Figure 5B:
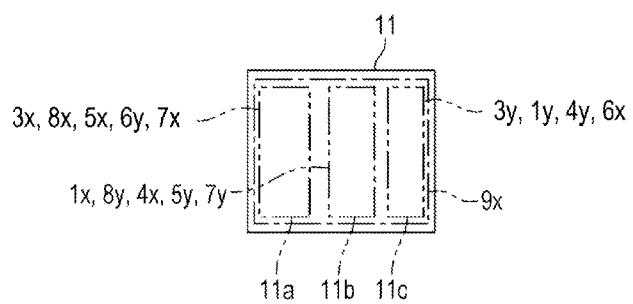

FIGS. 5A and 5B are views illustrating a form of a film thickness monitor area of the liquid crystal device 100 to which the invention is applied. That is, FIG. 5A is a cross-sectional view of the film thickness monitor area and FIG. 5B is a planar view of the film thickness monitor area. In addition, in FIG. 5A, films formed on the counter substrate 20 are not illustrated.

In the fabrication process of the element substrate 10 among the fabrication processes of the liquid crystal device 100 according to this form, a film forming process and a patterning process are repeatedly performed. At this time, film thicknesses of the scan line 3a, the semiconductor layer 1a, the gate electrode 8a, the drain electrode 4a, the capacitor line 5a, the data line 6a (relay electrode 6b), the light-shielding layer 7a (relay electrode 7b), and the first pixel electrode 9a, which are formed on the element substrate 10 are measured.

Due to this, as illustrated in FIGS. 2A and 2B, and FIGS. 5A and 5B, a film thickness monitor area 11 which will be described hereinafter is formed on the element substrate 10. On the film thickness monitor area 11, the scan lines 3a, the semiconductor layer 1a, the gate electrode 8a, the drain electrode 4a, the capacitor line 5a, the data lines 6a (the relay electrode 6b), the light-shielding layer 7a (the relay electrode 7b), and a film thickness monitor film formed in the same layer as the first pixel electrode 9a, are formed.

Here, the film thickness monitor area 11 has an area which is formed separately for each film, or an area in which multiple partial films are formed in an overlapped manner. In the following description, a case where three film thickness monitor areas (first film thickness monitor area 11a, second film thickness monitor area 11b, and third film thickness monitor area 11c) are formed at the film thickness monitor area 11, will be exemplified. In addition, in the following description, an example in which the scan line 3a is set as a first film, and a first film thickness monitor film 3x which is in the same layer as the scan line 3a is formed at the first film thickness monitor area 11a, among the films formed between the first substrate 10w and the first pixel electrode 9a, will be described. In addition, an example in which the semiconductor layer 1a is set as a second film, and a second film thickness monitor film 1x which is in the same layer as the semiconductor layer 1a is formed at the second film thickness monitor area 11b, will be described. In addition, an example in which the data line 6a is set as a third film, and a third film thickness monitor film 6x which is in the same layer as the data line 6a is formed in the third film thickness monitor area 11c, will be described.

In this form, a plurality of second pixel electrodes 9b (dummy pixel electrodes) are provided and are overlapped with the sealing material 107, and the film thickness monitor area 11 is formed in a position which is not overlapped with the second pixel electrode 9b among the areas overlapped with the sealing material 107. In addition, in this form, in a planar view which is viewed from a direction which is perpendicular to a first substrate 10, the sealing material 107 is formed in a rectangular shape, and the film thickness monitor area 11 is formed at each of a corner 107g around a corner which connects sides 10f and 20f to sides 10g and 20g, and a corner 107h around a corner which connects the side 10f and 20f to the sides 10g and 20g, from among four corners of such a shape. The film thickness monitor area 11 is classified into three areas (first film thickness monitor area 11a, second film thickness monitor area 11b, and third film thickness monitor area 11c). The first film thickness monitor area 11a, the second film thickness monitor area 11b, and the third film thickness monitor area 11c are provided in areas which are not overlapped with each other. Due to this, in the planar view which is viewed from the direction perpendicular to the first substrate 10, the second film thickness monitor area 11b is positioned, between the second pixel electrode 9b and the first film thickness monitor area 11a, and the third film thickness monitor area 11c is positioned between the second pixel electrode 9b and the second film thickness monitor area 11b. In addition, in FIGS. 2A and 2B, and FIGS. 5A and 5B, the planar size of the second pixel electrode 9b is represented so as to be larger than the planar sizes of the first film thickness monitor area 11a, the second film thickness monitor area 11b, and the third film thickness monitor area 11c, but the planar size of the second pixel electrode 9b is smaller than the planar sizes of the first film thickness monitor area 11a, the second film thickness monitor area 11b, and the third film thickness monitor area 11c. For example, the planar size of the second pixel electrode 9b is 15 µm×15 µm, but the planar sizes of the first film thickness monitor area 11a, the second film thickness monitor area 11b, and the third film thickness monitor area 11c are 100 µm×150 µm.

Here, the first film thickness monitor film 3x which is in the same layer as the scan line 3a (first film) is formed in the first film thickness monitor area 11a. In addition, in the first film thickness monitor area 11a, a film thickness monitor film 8x which is in the same layer as the gate electrode 8a, a film thickness monitor film 5x which is in the same layer as the capacitor line 5a, a film thickness monitor film 6y which is in the same layer as the data lines 6a, and a film thickness monitor film 7x which is in the same layer as the light-shielding layer 7a are formed so as to be overlapped with the first film thickness monitor film 3x.

At the second film thickness monitor area 11b, a second film thickness monitor film 1x which is in the same layer as the semiconductor layer 1a (second film) is formed. In addition, in the second film thickness monitor area 11b, a film thickness monitor film 8y which is in the same layer as the gate electrode 8a, a film thickness monitor film 4x which is in the same layer as the drain electrode 4a, a film thickness monitor film 5y which is in the same layer as the capacitor line 5a, and a film thickness monitor film 7y which is in the same layer as the light-shielding layer 7a are formed so as to be overlapped with the second film thickness monitor film 1x.

In the third film thickness monitor area 11c, the third film thickness monitor film 6x which is in the same layer as the data lines 6a (third film) is formed. In addition, in the third film thickness monitor area 11c, a film thickness monitor film 3y which is in the same layer as the scan lines 3a (first film), a film thickness monitor film 1y which is in the same layer as the semiconductor layer 1a, and a film thickness monitor film 4y which is in the same layer as the drain electrode 4a are formed so as to be overlapped with the third film thickness monitor film 6X.

Thus, after each film is formed or the patterning is performed, if a film thickness is measured in the first film thickness monitor area 11a, the second film thickness monitor area 11b, and the third film thickness monitor area 11c, it is possible to monitor the film thicknesses of the scan line 3a, the semiconductor layer 1a, the gate electrode 8a, the drain electrode 4a, the capacitor line 5a, the data lines 6a (relay electrode 6b), and the light-shielding layer 7a (relay electrode 7b).

In addition, a film thickness monitor film 9x for the pixel electrode, which is in the same layer as the first pixel electrodes 9a, is also formed in the first film thickness monitor area 11a, the second film thickness monitor area 11b, and the third film thickness monitor area 11c. Thus, after a film which forms the first pixel electrodes 9a is formed or the patterning is performed, if the film thicknesses is measured in the first film thickness monitor area 11a, the second film thickness monitor area 11b, or the third film thickness monitor area 11c, it is possible to monitor the film thickness of the first pixel electrodes 9a. In this form, the film thickness monitor film 9x for the pixel electrode is continuously formed in the first film thickness monitor area 11a and the second film thickness monitor area 11b. In addition, the film thickness monitor film 9x for the pixel electrode is continuously formed in the first film thickness monitor area 11a, the second film thickness monitor area 11b, and the third film thickness monitor area 11c.

In addition, in this form, in an area overlapped with the sealing material 107, a plurality of second pixel electrodes 9b are formed at a position adjacent to the film thickness monitor area 11, and among the second pixel electrodes 9b, the gap Ga between the second pixel electrode 9b adjacent to the film thickness monitor film 9x for the pixel electrode and the film thickness monitor film 9x for the pixel electrode is smaller than the gap Gb between the second pixel electrodes 9b adjacent to each other. Due to this, in an area overlapped with the sealing material 107, a difference of the distribution among the films which are in the same layer as the first pixel electrode 9a is small.

In this form, since the film thickness monitor area 11 (first film thickness monitor area 11a, second film thickness monitor area 11b, and third film thickness monitor area 11c) are formed in the corners 107g and 107h of the sealing material 107, the film thickness monitor area 11 (first film thickness monitor area 11a, second film thickness monitor area 11b, and third film thickness monitor area 11c) is adjacent to the substrate-to-substrate conduction unit 105. In other words, in a planar view which is viewed from a direction perpendicular to the first substrate 10, the substrate-to-substrate conduction unit 105 is positioned between an end portion of the second substrate 20 and the film thickness monitor area 11 (for example, between an end portion of the second substrate 20 and the first film thickness monitor area 11a). In the substrate-to-substrate conduction unit 105, the substrate-to-substrate conduction electrode 19 is formed by a conductive film which is in the same layer as the light-shielding layer 7a, and the substrate-to-substrate conduction electrode 19 is electrically connected to a wire 6e for the common potential Vcom which is formed in the same layer as the data line 6a via a contact hole 44e formed in the interlayer insulation film 44. In addition, in an area overlapped with the substrate-to-substrate conduction electrode 19, a conductive film 3e which is in the same layer as the scan line 3a is formed, and the conductive film 3e adjusts the height position of the conductive film 3e, and adjusts the depth of the contact hole 44e.

Main Effects of this Form

As described above, in the liquid crystal device 100 according to this form, the first film thickness monitor area 11a, the second film thickness monitor area 11b, and the third film thickness monitor area 11c are provided in an area overlapped with the sealing material 107 in the element substrate 10 (first substrate 10w), and the film thickness monitor film 9x for the pixel electrode which is in the same layer as the first pixel electrode 9a is also provided in any one of the first film thickness monitor area 11a, the second film thickness monitor area 11b, the third film thickness monitor area 11c. Due to this, it is possible to monitor the film thickness of the scan line 3a, the semiconductor layer 1a, the data line 6a, the first pixel electrode 9a, or the like in an area overlapped with the sealing material 107. Thus, it is not necessary to provide the first film thickness monitor area 11a, the second film thickness monitor area 11b, and the third film thickness monitor area 11c in a scribe area of a mother substrate for forming the element substrate 10. Therefore, when fabricating the element substrate 10, it is possible to narrow a width of the scribe area of the mother substrate.

In addition, in the film thickness monitor film 9x for the pixel electrode, while the film thickness monitor film 9x for the pixel electrode which are in the same layer as the first pixel electrodes 9a is formed in the first film thickness monitor area 11a, the second film thickness monitor area 11b, and the third film thickness monitor area 11c, a plurality of second pixel electrodes 9b which are in the same layer as the first pixel electrodes 9a are formed in an area overlapped with the sealing material 107. In addition, the gap Ga between the second pixel electrode 9b and the film thickness monitor film 9x for the pixel electrode is smaller than the gap Gb between the second pixel electrodes 9b. Due to this, at the area overlapped with the sealing material 107, a difference in the distribution among the films which are in the same layer as the first pixel electrodes 9a is small. Thus, even in a case where the film thickness monitor area 11 is provided in the area overlapped with the sealing material 107, it is possible to decrease the variation of the interval between the element substrate 10 (first substrate 10w) and the counter substrate 20 (second substrate 20w). Therefore, it is possible to accurately define a thickness of the liquid crystal layer 50. In addition, the interval in a position in which the substrate-to-substrate conduction unit 105 is provided is stable, and thereby it is possible to electrically connect the first substrate 10w to the second substrate 20w reliably, in the substrate-to-substrate conduction unit 105.

In addition, in this form, since a plurality of second pixel electrodes 9b are formed, an area in contact with a base of the alignment film 16 in the element substrate 10 (first substrate 10w) is wide. Therefore, the adhesiveness of the alignment film 16 is high.

Such an effect will be described by comparing with the reference examples illustrated in FIGS. 6A to 6C. For example, in a reference example 1 illustrated in FIG. 6A, the film thickness monitor film 9x for the pixel electrode is formed only at the first film thickness monitor area 11a, and the second pixel electrode 9b is not formed. Due to this, in the gap material 107a of the sealing material 107, there are many gap materials 107s which are not in contact with both sides of the element substrate 10 and the counter substrate 20, and there are small gap materials 107t which are in contact with both sides of the element substrate 10 and the counter substrate 20. Thus, the variation of the interval between the element substrate 10 and the counter substrate 20 is high. In addition, as in the reference example 1 illustrated in FIG. 6A, in a case where the second pixel electrode 9b is not formed, the area in contact with the base of the alignment film 16 is narrow, and thus the adhesiveness of the alignment film 16 is low.

In addition, in a reference example 2 illustrated in FIG. 6B, the film thickness monitor film 9x for the pixel electrode is formed only at the first film thickness monitor area 11a, but the second pixel electrode 9b is formed. Even in such a form, the film thickness monitor film 9x for the pixel electrode is not formed in the second film thickness monitor area 11b and the third film thickness monitor area 11c, and thereby, gap materials 107s which are not in contact with both sides of the element substrate 10 and the counter substrate 20 are formed. Thus, since there are small gap materials 107t which are in contact with both sides of the element substrate 10 and the counter substrate 20, variation of the interval between the element substrate 10 and the counter substrate 20 is high.

In addition, in the reference example 3 illustrated in FIG. 6C, the film thickness monitor film 9x for the pixel electrode which is in the same layer as the first pixel electrodes 9a is provided in all of the first film thickness monitor area 11a, the second film thickness monitor area 11b, and the third film thickness monitor area 11c. However, the second pixel electrode 9b is not formed. In such a form, since the second pixel electrode 9b is not formed, there are many gap materials 107s which are not in contact with both sides of the element substrate 10 and the counter substrate 20, and there are small gap materials 107t which are in contact with both sides of the element substrate 10 and the counter substrate 20. Due to this, the variation of the interval between the element substrate 10 and the counter substrate 20 is high. In addition, as in the reference example 1 illustrated in FIG. 6C, in a case where the second pixel electrode 9b is not formed, the area in contact with the alignment film 16 is narrow, and thus, the adhesiveness of the alignment film 16 is low.

Other Embodiment

In the above-described embodiments, three film thickness monitor areas 11 are formed in one place, but the invention may be applied to a case where two film thickness monitor areas 11 or four or more film thickness monitor areas 11 are formed in one place, and in each case, the film thickness monitor film 9x for the pixel electrode is formed on two or more film thickness monitor areas 11.

In addition, the film thickness monitor film 9x for the pixel electrode is continuously formed on two or more film thickness monitor areas 11, but may be formed by being divided for each film thickness monitor area 11.

In the above-described embodiments, the transmissive liquid crystal device is exemplified as a liquid crystal device, but the invention may be applied to a reflection type liquid crystal device.

Figure 7A:
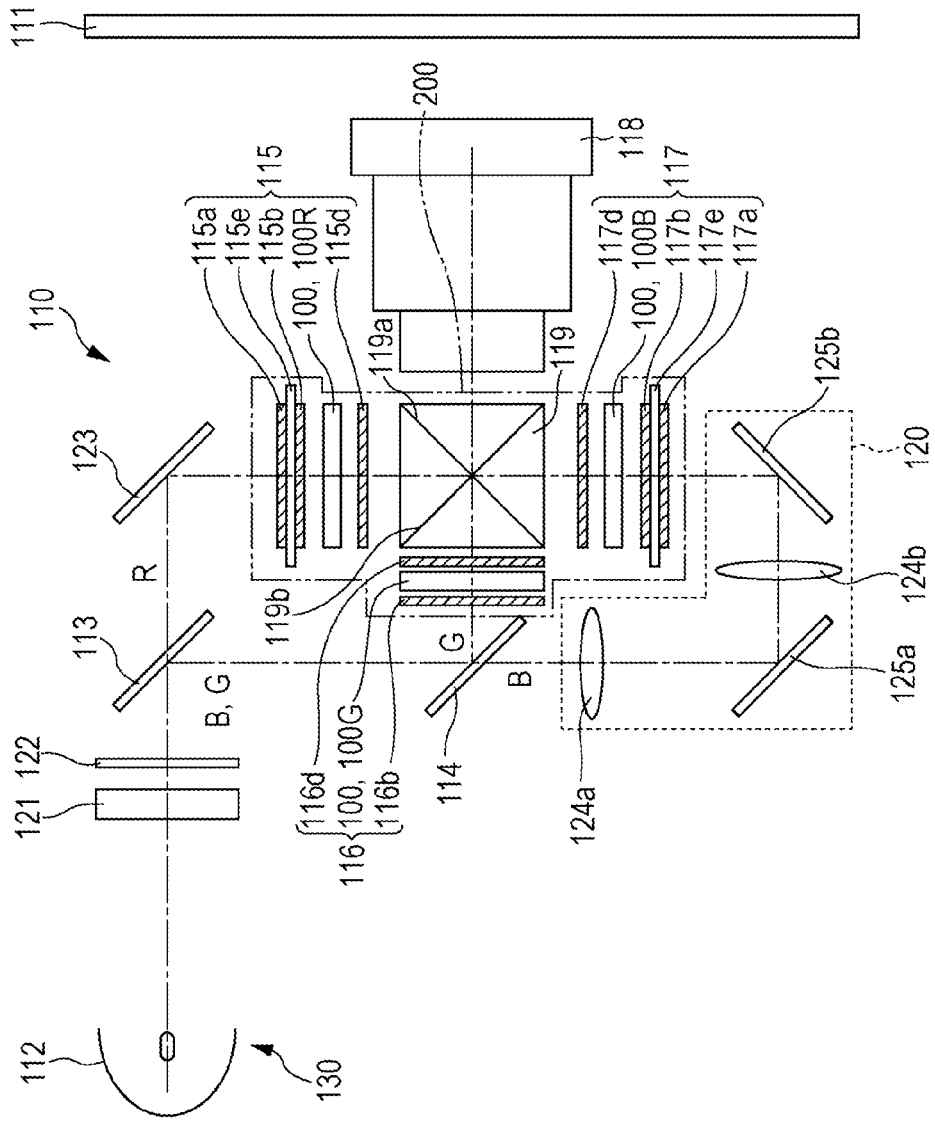
FIGS. 7A and 7B are schematic configuration diagrams illustrating a projection type display device (electronic apparatus) to which the invention is applied.
Figure 7B:
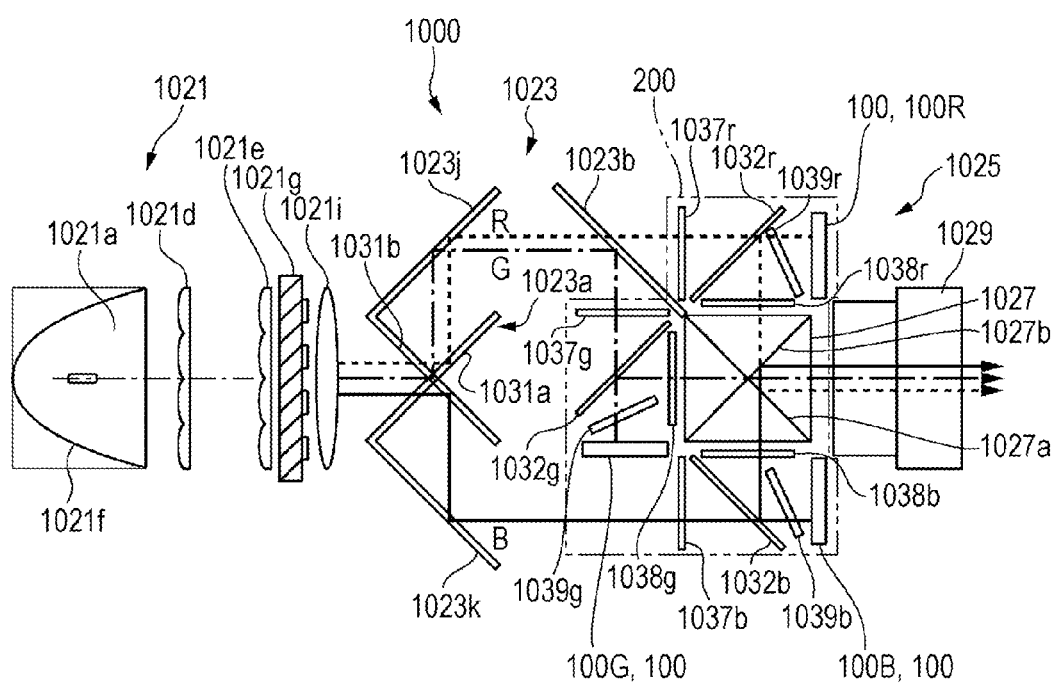

Example in which Electronic Apparatus is Embedded
Configuration Example of Projection Type Display Device and Optical Unit FIGS. 7A and 7B are schematic configuration diagrams illustrating a projection type display device (electronic apparatus) to which the invention is applied. That is, FIG. 7A is a diagram illustrating a projection type display device which uses a transmissive liquid crystal device, and FIG. 7B is a diagram illustrating a projection type display device which uses a reflection type display device.

FIG. 7A is an example in which a projection type display device 110 uses a projection type liquid crystal panel as a liquid crystal panel, and FIG. 7B is an example in which a projection type display device 1000 uses a reflection type liquid crystal panel as a liquid crystal panel. However, as will be described hereinafter, the projection type display devices 110 and 1000 include light source units 130 and 1021, a plurality of liquid crystal devices 100 to which light beams with wavelength bands different from each other are supplied from the light source units 130 and 1021, cross dichroic prisms (photosynthesis optical systems) 119 and 1027 which synthesize light beams emitted from a plurality of liquid crystal device 100 and emit the synthesized light beams, and projection optical systems 118 and 1029 which project the light beams synthesized by the photosynthesis optical systems. In addition, the projection type display devices 110 and 1000 use an optical unit 200 which includes the liquid crystal device 100 and the cross dichroic prisms (photosynthesis optical systems) 119 and 1027.

First Example of Projection Type Display Device

The projection type display device 110 illustrated in FIG. 7A is a projection type display device of a so-called shadow projection type, which radiates light onto a screen 111 provided on a viewer's side, and observes the light reflected by the screen 111. The projection type display device 110 includes a light source unit 130 which includes a light source 112, dichroic mirrors 113 and 114, liquid crystal light valves 115 to 117, a projection optical system 118, a cross dichroic prism (synthesis optical system) 119, and a relay system 120.

The light source 112 is configured by an ultrahigh pressure mercury lamp which supplies light including red light R, green light G, and blue light B. The dichroic mirror 113 transmits the red light R from the light source 112, and reflects the green light G and blue light B. In addition, the dichroic mirror 114 transmits the blue light B and reflects the green light G, among the blue light B and the green light G reflected by the dichroic mirror 113. In this way, the dichroic mirrors 113 and 114 configure a color division optical system which divides the light emitted from the light source 112 into the red light R, the green light G, and the blue light B.

Here, an integrator 121 and a polarized light conversion element 122 are arranged sequentially from the light source 112, between the dichroic mirror 113 and the light source 112. The integrator 121 makes an illumination distribution of the light radiated from the light source 112 uniform. In addition, the polarized light conversion element 122 converts the light from the light source 112 into polarized light with a predetermined vibration direction such as s-polarized light.

The liquid crystal light valve 115 is a transmissive liquid crystal device that modulates the red light which transmits the dichroic mirror 113 and is reflected by a reflection mirror 123, according to the image signal. The liquid crystal light valve 115 includes a λ/2 phase difference plate 115a, a first polarizing plate 115b, the liquid crystal device 100 (liquid crystal panel 100R for red), and the second polarizing plate 115d. Here, even if the red light R which is incident to the liquid crystal light valve 115 is transmitted by the dichroic mirror 113, the polarization of the light is not changed, and thus, the s-polarized light is maintained as it is.

The λ/2 phase difference plate 115a is an optical element which converts the s-polarized light incident to the liquid crystal light valve 115 into p-polarized light. In addition, the first polarizing plate 115b is a polarizing plate which shields the s-polarized light and transmits the p-polarized light. Then, the liquid crystal device 100 (liquid crystal panel 100R for red) converts the p-polarized light into s-polarized light (circularly polarized light or elliptically polarized light if halftone) using a modulation according to the image signal. Furthermore, the second polarizing plate 115d is a polarizing plate which shields the p-polarized light and transmits the s-polarized light. Thus, the liquid crystal light valve 115 modulates the red light R according to the image signal, and emits the modulated red light R toward the cross dichroic prism 119.

In addition, the λ/2 phase difference plate 115a and the first polarizing plate 115b are arranged in a state of being in contact with a glass plate 115e having transparency which does not convert the polarized light, and it is possible to prevent the λ/2 phase difference plate 115a and the first polarizing plate 115b from being distorted by heat generation.

The liquid crystal light valve 116 is a transmissive liquid crystal device that modulates the green light G which is reflected by the dichroic mirror 113 and then reflected by the dichroic mirror 114, according to the image signal. The liquid crystal light valve 116 includes a first polarizing plate 116b, the liquid crystal device 100 (liquid crystal panel 100G for green), and a second polarizing plate 116d, in the same manner as the liquid crystal light valve 115. The green light G which is incident to the liquid crystal light valve 116 is the s-polarized light which is reflected by the dichroic mirrors 113 and 114 and then becomes incident thereon. The first polarizing plate 116b is a polarizing plate which shields the p-polarized light and transmits the s-polarized light. In addition, the liquid crystal device 100 (liquid crystal panel 100G for green) modulates the s-polarized light according to the image signal which is then converted into the p-polarized light (circularly polarized light or elliptically polarized light if halftone). Then, the second polarizing plate 116d which is a polarizing plate that shields the s-polarized light, transmits the p-polarized light. Thus, the liquid crystal light valve 116 modulates the green light G according to the image signal, and emits the modulated green light G toward the cross dichroic prism 119.

The liquid crystal light valve 117 is a transmissive liquid crystal device that modulates the blue light B which is reflected by the dichroic mirror 113, is transmitted by the dichroic mirror 114, and passes through the relay system 120, according to the image signal. The liquid crystal light valve 117 includes a λ/2 phase difference plate 117a, a first polarizing plate 117b, the liquid crystal device 100 (liquid crystal panel 100B for blue), and a second polarizing plate 117d, in the same manner as the liquid crystal light valves 115 and 116. Here, the blue light B incident to the liquid crystal light valve 117 is reflected by the dichroic mirror 113, transmitted to the dichroic mirror 114, and then, is reflected by two reflection mirrors 125a and 125b of a relay system 120 which will be described later, thereby becoming s-polarized light.

The λ/2 phase difference plate 117a is an optical element which converts the s-polarized light incident to the liquid crystal light valve 117 into p-polarized light. In addition, the first polarizing plate 117b is a polarizing plate which shields the s-polarized light and transmits the p-polarized light. Then, the liquid crystal device 100 (liquid crystal panel 100B for blue) modulates the p-polarized light according to the image signal, which is thereby converting the modulated p-polarized light into s-polarized light (circularly polarized light or elliptically polarized light if halftone). Furthermore, the second polarizing plate 117d is a polarizing plate which shields the p-polarized light and transmits the s-polarized light. Thus, the liquid crystal light valve 117 modulates the blue light B according to the image signal, and emits the modulated blue light B toward the cross dichroic prism 119. In addition, the λ/2 phase difference plate 117a and the first polarizing plate 117b are arranged in a state of being in contact with the glass plate 117e.

The relay system 120 includes relay lenses 124a and 124b, and reflection mirrors 125a and 125b. The relay lenses 124a and 124b are provided so as to prevent light loss due to the long light path of the blue light B. Here, the relay lens 124a is disposed between the dichroic mirror 114 and the reflection mirror 125a. In addition, the relay lens 124b is disposed between the reflection mirrors 125a and 125b. The reflection mirror 125a is disposed in such a manner that the blue light B which is transmitted by the dichroic mirror 114 and is emitted from the relay lens 124a is reflected toward the relay lens 124b. In addition, the reflection mirror 125b is disposed in such a manner that the blue light B which is emitted from the relay lens 124b is reflected toward the liquid crystal light valve 117.

The cross dichroic prism 119 is a color synthesizing optical system in which two dichroic films 119a and 119b are orthogonally disposed in an X shape. The dichroic film 119a is a film which reflects the blue light B and transmits the green light G, and the dichroic film 119b is a film which reflects the red light R and transmits the green light G. Thus, the cross dichroic prism 119 synthesizes the red light R, the green light G, and the blue light B which are modulated by each of the liquid crystal light valves 115 to 117, and emits the synthesized light beams toward the projection optical system 118.

In addition, the light beams which are emitted from the liquid crystal light valves 115 and 117, and incident to the cross dichroic prism 119 are the s-polarized light, and the light beams which are emitted from the liquid crystal light valve 116, and incident to the cross dichroic prism 119 are the p-polarized light. In this way, the light beams incident to the cross dichroic prism 119 is different types of polarized light beams, and thereby it is possible for the cross dichroic prism 119 to synthesize the light beams incident from the liquid crystal light valves 115 to 117. Here, in general, the dichroic films 119a and 119b have an excellent reflection transistor characteristic of the s-polarized light. Due to this, the red light R and the blue light B which are reflected by the dichroic films 119a and 119b are set as the s-polarized light, and the green light G which is transmitted by the dichroic films 119a and 119b is set as the p-polarized light. The projection optical system 118 includes a projection lens (not illustrated), and projects the light synthesized by the cross dichroic prism 119 onto the screen 111.

Second Example of Projection Type Display Device

The projection type display device 1000 illustrated in FIG. 7B includes a light source unit 1021 which generates a light source light, a color division light guiding optical system 1023 which divides the light source light emitted from the light source unit 1021 into three kinds of colored light beams including the red light R, the green light G, and the blue light B, and a light modulation unit 1025 which is illuminated by the light source light of each color emitted from the color division light guiding optical system 1023. In addition, the projection type display device 1000 includes a cross dichroic prism 1027 (synthesis optical system) which synthesizes the image light beams of colors emitted from the light modulation unit 1025, and a projection optical system 1029 which projects the image light which passes the cross dichroic prism 1027 onto a screen (not illustrated).

In the projection type display device 1000, the light source unit 1021 includes a light source 1021a, a pair of fly-eye optical systems 1021d and 1021e, a polarized light conversion member 1021g, and an overlapping lens 1021i. In this form, the light source unit 1021 includes a reflector 1021f formed with a paraboloid, and emits parallel light. The fly-eye optical systems 1021d and 1021e are formed with a plurality of element lenses which are arranged in a matrix within a plane orthogonal to a system light axis, divide the light source light using such element lenses, and separately concentrate and diverge the divided light beams. For example, the polarized light conversion member 1021g converts the light source light emitted from the fly-eye optical system 1021e into only a p-polarized light ingredient parallel in the figure and supplies the p-polarized light ingredient to the optical system on a light path downstream side. The overlapping lens 1021i appropriately converges the entire light source light which passes the polarized light conversion member 1021g, and thereby it is possible to provide uniformly overlapped illumination to the plurality of liquid crystal devices 100 provided the light modulation unit 1025, respectively.

The color division light guiding optical system 1023 includes a cross dichroic mirror 1023a, a dichroic mirror 1023b, and reflection mirrors 1023j and 1023k. In the color division light guiding optical system 1023, the light source light which is approximately white from the light source unit 1021 is incident to the cross dichroic mirror 1023a. The red light R reflected by a first dichroic mirror 1031a which configures the cross dichroic mirror 1023a is reflected by the reflection mirror 1023j, is transmitted to the dichroic mirror 1023b, and is incident to the liquid crystal device 100 (liquid crystal panel 100R for red) as the p-polarized light, via an incident side polarized light plate 1037r, a wire grid polarized light plate 1032r which transmits the p-polarized light and reflects the s-polarized light, and an optical compensation plate 1039r.

In addition, the green light G which is reflected by the first dichroic mirror 1031a is reflected by the reflection mirror 1023j, and then, is also reflected by the dichroic mirror 1023b, and is incident onto the liquid crystal device 100 (liquid crystal panel 100G for green) as the p-polarized light, via an incident side polarized light plate 1037g, a wire grid polarized plate 1032g which transmits the p-polarized light and reflects the s-polarized light, and an optical compensation plate 1039g.

In contrast, the blue light B reflected by a second dichroic mirror 1031b which configures the cross dichroic mirror 1023a is reflected by the reflection mirror 1023k, and is incident to the liquid crystal device 100 (liquid crystal panel 100B for blue) as the p-polarized light, via an incident side polarized light plate 1037b, a wire grid polarized plate 1032b which transmits the p-polarized light and reflects the s-polarized light, and an optical compensation plate 1039b. In addition, the optical compensation plates 1039r, 1039g and 1039b adjust a polarized light state of the incident light and emitted light onto and from the liquid crystal device 100, and thereby the characteristic of the liquid crystal layer is optically compensated.

In the projection type display device 1000 configured in such a manner, the three kinds of colored light beams which pass the optical compensation plate 1039r, 1039g, and 1039b, and then are incident are modulated by liquid crystal devices 100 respectively. At this time, ingredient light of the s-polarized light among the modulated light which is emitted from the liquid crystal device 100 is reflected by the wire grid polarized light plates 1032r, 1032g, and 1032b, and is incident to the cross dichroic prism 1027 via emission side polarized light plates 1038r, 1038g, and 1038b. A first dielectric multilayer film 1027a and a second dielectric multilayer film 1027b which are orthogonal to each other in an X shape are formed in the cross dichroic prism 1027, the first dielectric multilayer film 1027a reflects the red light R, and the second dielectric multilayer film 1027b reflects the blue light B. Thus, the three kinds of colored light beams are synthesized in the cross dichroic prism 1027, and are emitted to the projection optical system 1029. Then, the projection optical system 1029 projects the image light with the color synthesized by the cross dichroic prism 1027 onto the screen (not illustrated) at a desired magnification.

Another Projection Type Display Device

In addition, in another projection type display device, an LED light source or the like which emits light beams of various colors is used as a light source unit, and each color light emitted from such an LED light source may be supplied to another liquid crystal device.

Another Electronic Apparatus

The liquid crystal device 100 to which the invention is applied may be used as a direct view type display device in an electronic apparatus, such as a mobile phone, a personal digital assistant (PDA), a digital camera, a liquid crystal television, a car navigation device, a video phone, a POS terminal, or an apparatus including a touch panel, in addition to the above-described electronic apparatus.

The entire disclosure of Japanese Patent Application No. 2013-212633, filed Oct. 10, 2013 is expressly incorporated by reference herein.

What is claimed is:
1. A liquid crystal device comprising:
   a first substrate that has a first area, a second area positioned outside the first area, and a third area positioned between the first area and the second area in a plan view;
   a first pixel electrode that is disposed above the first substrate in the first area;
   a second substrate that is opposed to the first substrate;
   a sealing material that is disposed between the first substrate in the second area and the second substrate; and
   a second pixel electrode that is disposed above the first substrate in the third area and is disposed in a first layer in which the first pixel electrode is disposed,
   wherein a first forming film is disposed in a second layer, which is positioned between the first substrate and the first layer,
   a second forming film is disposed in a third layer which is positioned between the first layer and the second layer and does not overlap with the first forming film, a third forming film is disposed in the first layer, overlaps with the first forming film and the second forming film, and is disposed between the first substrate and the sealing material, and the first forming film and the second forming film are disposed between the third forming film and the first substrate, and wherein the first forming film, the second forming film, and the third forming film are disposed above the first substrate in the second area.

2. The liquid crystal device according to claim 1, further comprising:

a plurality of second pixel electrodes disposed above the first substrate in the third area and disposed in the first layer, the plurality of second pixel electrodes including the second pixel electrode, which is disposed in the first layer adjacent to the third forming film, wherein a gap between the third forming film and the second pixel electrode adjacent to the third forming film is smaller than a gap between second pixel electrodes adjacent to each other, among the plurality of second pixel electrodes.

3. An electronic apparatus comprising the liquid crystal device according to claim 2.

4. The liquid crystal device according to claim 1, wherein a substrate-to-substrate conduction unit which electrically connects the first substrate to the second substrate is provided between the first area and an end portion of the second substrate, in a planar view.

5. An electronic apparatus comprising the liquid crystal device according to claim 4.

6. The liquid crystal device according to claim 1, wherein the sealing material is formed in a planar shape of a polygon, and wherein the first area and the second area are provided in corners of the polygon.

7. An electronic apparatus comprising the liquid crystal device according to claim 6.

8. An electronic apparatus comprising the liquid crystal device according to claim 1.

9. The liquid crystal device according to claim 1, wherein the third forming film does not overlap with the first pixel electrode and the second pixel electrode.

10. The liquid crystal device according to claim 1, wherein the first forming film, the second forming film, and the third forming film are formed of a conductive material.

11. The liquid crystal device according to claim 1, further comprising:

a scan line disposed in the second layer.

12. The liquid crystal device according to claim 1, further comprising:

a semiconductor layer that is disposed in the third layer.

13. The liquid crystal device according to claim 1, further comprising:

a fourth forming film that is disposed in a fourth layer which is positioned between the first layer and the third layer, does not overlap with the first forming film and the second forming film, and overlaps with the third forming film, and a data line disposed in the fourth layer.

* * * * *